Figure 1:
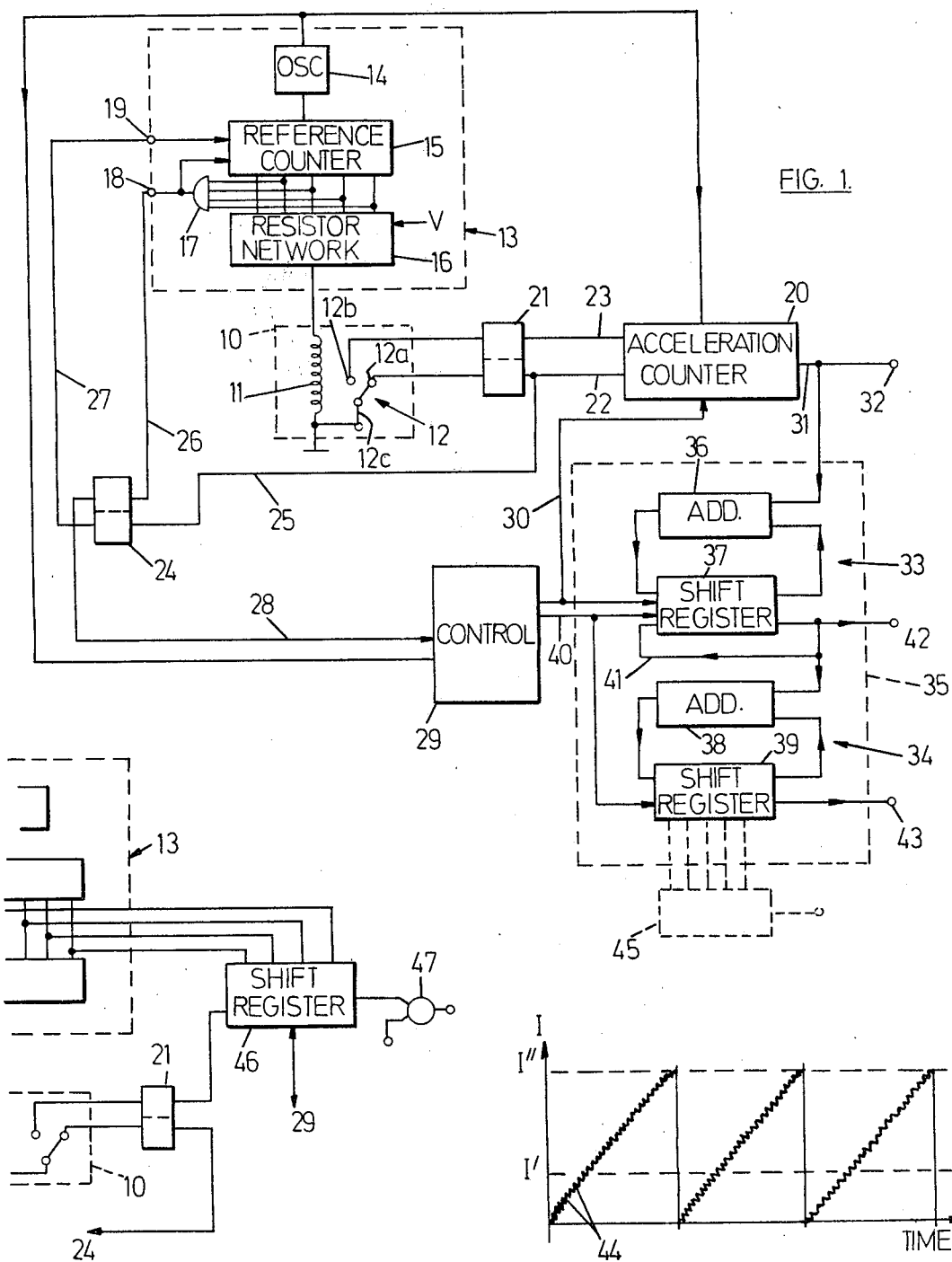

United States Patent [19]
Griffiths et al.

[11] 3,901,086
[45] Aug. 26, 1975

[54] ACCELEROMETERS

[75] Inventors: William Edward Griffiths, Middleton; Peter Stanley Levis, Bramhall, both of England

[73] Assignee: Ferranti, Limited, Hollinwood, England

[22] Filed: June 26, 1974

[21] Appl. No.: 483,416

[30] Foreign Application Priority Data
June 30, 1973 United Kingdom.............. 31259/73

[52] U.S. Cl..................... 73/490; 73/503; 73/517 B
[51] Int. Cl....................... G01p 15/08; G01c 21/16
[58] Field of Search....... 73/490, 503, 516 R, 517 B

[56] References Cited
UNITED STATES PATENTS
2,988,737   6/1961   Schroeder......................... 73/517 B

*Primary Examiner*—James J. Gill
*Attorney, Agent, or Firm*—Cameron, Kerkam, Sutton, Stowell & Stowell

[57] ABSTRACT

An accelerometer of the force-balance type has an inertial mass, able to be displaced under the action of an acceleration force, and electromagnetic coil responsive to a current flow in the coil to generate a restoring force on the mass to oppose the acceleration force. The mass controls a switch such that when the mass is displaced under acceleration operation of the switch causes a linearly increasing current to be applied to the coil up to a predetermined value in a reference time period. The current is generated by an oscillator, a first counter and binary resistor ladder network and the time period is that for the number of oscillations required to generate the predetermined value of current. When the current flow causes the mass to be restored further operation of the switch causes a counter, started with the first counter, to stop counting. In any one reference time period the total in the second counter is an indication of the acceleration value (by equating the acceleration force with the current generated force required to overcome it). The second counter provides a serial binary output for further processing or for passing to an integrating or summating circuit to provide in the same form signals representing the velocity of, and distance travelled by, the accelerometer.

12 Claims, 3 Drawing Figures

PATENTED AUG 26 1975　　3,901,086

ACCELEROMETERS

THIS INVENTION relates to accelerometers, and in particular to accelerometers of the force-balance type.

Basically, the force-balance accelerometer comprises an inertial mass carried on an arm so that it may move in response to an acceleration force acting on the mass in a direction perpendicular to the arm. The arm carries a pick-off or carries or actuates switching means operable to control the energising current of an electromagnetic coil such that the displacement of the arm is substantially nullified. Accelerometers of the force-balnce type wherein movement of the inertial mass through a predetermined distance by the acceleration force causes actuation of switching means have been described in British Specification Specificaiton No. 1,362,121 and British Patent Specification No. 1,259,203.

It is an object of the present invention to provide an improved accelerometer of the force-balance type.

According to the present invention an accelerometer of the force-balance type comprises an inertial mass to be acted upon and displaced by an acceleration force, an electromagnetic coil responsive to a current flow therein to exert a restoring force on the mass in opposition to the acceleration force, switching means operable to maintain a first state while the acceleration force is greater than the restoring force and operable to maintain a second state while the restoring force is greater than the acceleration force, coil energising means responsive to entry of the switching means to the first state to apply to the coil a reference signal in the form of a current, the magnitude of which varies within a reference time period, and in accordance with a predetermined law, from a datum value to a predetermined reference value, thereafter returning to the datum value, and output means responsive to entry of the switching means to the second state in any reference time period to provide an output signal representative of the magnitude of the reference signal, with respect to the datum value, at which the restoring force equals the acceleration force and indicative of the magnitude of the acceleration force in that reference time period.

Figures 2, 3:
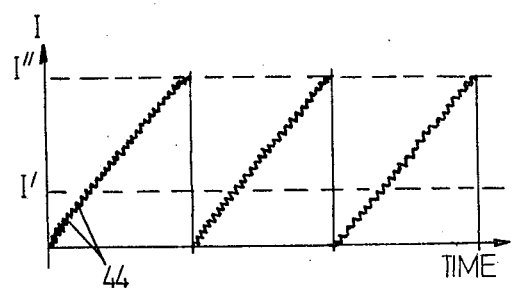

The present invention and distance measuring apparatus of which it forms a part will now be described by way of example with reference to the accompanying drawing, in which:

FIG. 1 is a circuit block diagram of the acceleration and distance measuring arrangement, FIG. 2 shows the variation with time of current caused to flow in the accelerometer coil, and FIG. 3 is part of a circuit block diagram similar to that of FIG. 1 but showing an alternative arrangement acceleration measurement.

An accelerometer mechanism of the force-balance type described in the aforementioned specification No. 1,362,121 comprises an electromagnetic coil in a uniform magnetic field in the manner of a moving coil instrument. An inertial mass, comprising an arm, is attached to the coil for rotation therewith. The arm comprises a moving contact of an electric switch which has fixed contacts spaced apart and between which the moving contact rests in equilibrium. Under acceleration, the arm is moved such that the moving contact engages a fixed contact and causes a current to flow in the coil so as to rotate the arm away from the fixed contact. When contact is broken the current ceases and the contact is remade. The average current flowing through the coil to counterbalance the acceleration force gives an indication of the magnitude of the acceleration.

Referring to FIG. 1 which shows apparatus for measuring distance travelled, an accelerometer mechanism 10 of the force-balance type has an electromagnetic coil 11 and switching means comprising a single-pole double-throw switch 12. The switch 12 comprises fixed contacts 12a and 12b and a movable contact 12c. The contact 12c has attached thereto the inertial mass (not shown) of the accelerometer and the arrangement is such that when the inertial mass is acted upon by an acceleration force the switch is "made," that is, contacts 12a and 12c are closed, and when a sufficiently large current flows in the coil 11 to overcome the acceleration force, the switch is "broken," that is contacts 12b and 12c are closed.

The accelerometer coil 11 is connected to a source 13 of increasing current forming part of coil energising means. The source 13 comprises an oscillator 14 operable to produce pulses at a constant repetition frequency, a first counter 15 of the oscillator pulses (hereinafter called the reference counter) and a binary scaled resistor network 16. The counter provides a parallel output in binary form and the binary scaled resistor network 16 comprises a plurality of resistors scaled with respect to each other and arranged such that the successive stages of the counter switch into the circuit resistors having a vlaue R, 2R, 4R, 8R, . . . nR. The network 16 is also supplied with a reference potential V such that for each stage in the count the current flowing from the resistor network 16 to coil 11 of the accelerometer increases by a step unit of $V/nR$.

Appropriate stages of the counter 15 provide input signals to an AND gate 17 which gate provides an output signal at terminal 18. The gate signal is fed to a reset input of the counter 15 so that the counter automatically returns to zero after counting a predetermined number of pulses. The counter 15 also has an "enable" input, fed from a terminal 19 and to which a signal must be applied to enable the counter to begin counting when reset.

The accelerometer also comprises a second counter 20 (hereinafter called the acceleration counter) arranged to count pulses produced by the oscillator 14.

The fixed terminals 12a and 12b of the accelerometer switch are connected respectively to SET and RESET inputs of a bistable latch 21. The outputs of the latch 21 of the switching means are connected to control the acceleration counter 20 such that the latch is SET to provide an output on a line 22 to cause the counter to begin counting and is RESET to provide an output on a line 23 to cause the counter to cease counting.

A counter synchronisation (sync.) latch 24 has a SET input connected to the line 22 by way of a line 25 and a RESET input connected to the output terminal 18 of the gate 17 by way of a line 26. When SET the latch 24 provides an enable signal to the reference counter terminal 19 by way of line 27. The source 13, sync. latch 24 and bistable latch 21 comprise the coil energising means. When RESET the sync. latch provides a triggering signal on a line 28 to a circuit control element 29. The control element 29 also receives a clocking input from the oscillator 14 and provides, when triggered, a shift signal to the acceleration counter by way of line 30 to remove the contents thereof along a line 31 to an "acceleration" output terminal 32. The counter 20 and control element 29 comprise output means.

The apparatus further comprises first and second integration or summation means 33 and 34 and shown together generally at 35. The first and second summation means are serially connected to receive the contents of the acceleration counter and to perform a double integration process on it under the control of the control element 29.

The first summation means 33 comprises an addition element 36 and a shift register 37. The shift register 37 is arranged to receive shift signals from the line 30 such that the contents of both the register and of the counter 20 are shifted into the addition element 36, added and returned to the register. The second summation means 34 comprises an addition element 38 and a shift register 39 interconnected in a manner similar to the first summation means. The registers 37 and 39 are arranged to be provided with shift signals from the control element 29 by way of line 40, which shift signals cause the contents of the registers 37 and 39 to be fed into, and added in, the element 38 and the total fed into register 39; the contents of the register 37 are recirculated by way of line 41. The line 41 is connected to a "velocity" output terminal 42. The register 39 has an output line connected to a "distance" output terminal 43.

In operation, when the apparatus and particularly the accelerometer mechanism is at rest, the switch 12 has contacts 12c and 12b closed, that is, broken, the sync. latch 24 is in the RESET state and no enable signal is applied to the terminal 19 of the counter 15. If the inertial mass (not shown) of the accelerometer is acted upon by an acceleration force such that the switch 12 is made and contacts 12a and 12c become closed, the latch 21 is SET to produce an output signal on the line 22 to enable the acceleration counter 20 to count oscillator pulses, and SET's the sync. latch 24 to enable the reference counter 15. The oscillator pulses are counted in both the reference counter 15 and the acceleration counter 20. As the count accumulates in the counter 15 the current through the accelerometer coil increases in discrete steps, as shown at 44 in FIG. 2. When the current flowing in the accelerometer coil has reached a level (I' in FIG. 2) sufficient to produce a force in the coil which overcomes the acceleration force, the switch 12 is broken. The latch 21 is triggered to provide an output signal on the line 23 which stops the counter 20 from increasing its count further and stores the value reached. The reference counter 15 continues counting until it reaches the level (I'' in FIG. 2) at which the gate 17 opens and the counter 15 is cleared. The signal produced by the gate 17 also resets the sync. latch 24 to remove the output signal from the line 27 thereby disabling the reference counter 15 and preventing it from beginning to count from zero. The RESET of the latch 24 provides a trigger signal to the control means 29 on line 28.

It will be appreciated that the value of I', represented in the counter by the number of oscillator pulses required to produce the current I' in the coil 11, bears a direct relationship to the acceleration being undergone by the inertial mass in any one reference time period, that is, in the time period taken for the reference counter to produce the current I'' in the coil. The contents of the counter 20 thus represent for each reference time period an indication of the acceleration force acting on the mass and of the acceleration being undergone by the accelerometer. At the end of each time period the acceleration value is removed by shift pulses from the control element 29 to external circuitry (not shown) such as averaging means or a computer able to accept the information in binary serial form.

In the distance measuring arrangement of the present embodiment the velocity of the accelerometer is given by the time integral of the acceleration value, by the summation of the acceleration values for individual reference time periods over a plurality of reference time periods, and the distance travelled is given by the time integral or summation of the velocity. If acceleration takes place from rest then the distance travelled is the straight summation of the velocity values; where the accelerometer has an initial velocity this must be entered as a constant into the first summation means.

The trigger signal applied to the control element 29 causes a number, Z, of pulses, equal to the number of stages in the counter 20 and the addition element of the summation means to be applied to the counter 20 and shift register 37 such that the contents of the register 37 (initially zero) are fed to the addition element 36 and added to the final level of the counter, fed to the addition circuit by line 31. The total is returned to the register 37. After the Z pulses have controlled the first summation a second summation signal consisting of a further Z pulse is applied to the registers 37 and 39 the contents of which are fed into the addition element and the sum returned to the register 39.

When the counter 15 is cleared the current flowing through the accelerometer coil is reduced to zero. The acceleration force acting on the inertial mass operates to re-make the switch 12. The latch 21 provides an output signal on line 22 which enables the acceleration counter 20 and (by way of the sync. latch 24) the reference counter 15 to begin counting oscillator pulses again. The current through the coil 11 increases in a linear step-wise manner and when the force the coil exerts on the inertial mass exceeds the acceleration force, the switch 12 is again broken. Once again the acceleration counter 20 holds the count until the reference counter is cleared, when resetting of the sync. latch 24 triggers the control element 29. The newly counted number of pulses stored in the counter 20 is added to the previously stored total in the register 37; subsequently the new total stored in 37 is added to the previously accummulated total in register 39.

The shift register 39 (or 37) may be provided with a parallel output connected to a similar register 45, shown ghosted, containing a preset value in binary form, an output signal being produced when the distance (or velocity) exceeds the preset value.

Removal of the stored value from the counter 20 has to be effected while the sync. latch 24 is in the RESET state, that is, within the time (called the fly-back time) taken for the switch 12 to be re-made under the action of the inertial mass, and is normally of the order of the period of the oscillator 14 pulses. Employing an oscillator frequency of 10 kHz the pulse period is 100 $\mu$ seconds, within which time the counter can be read and both summation steps made. If desired the contents of the counter 20 could be shifted into a buffer store (not shown) to enable the summation to take place during the following reference time period. Alternatively, the first summation step could be performed during the fly-back time with the second step taking place in the following reference time period.

In the embodiment shown, the RESET output of the sync. latch 24 is used to trigger the control element at the end of each reference time period. It will be appreciated that the signal on line 23 to stop the counter 20 could be used to the same effect, giving the remainder of the reference time period in which to perform the counter read-out or summation. Trigger signals from the line 23, however, are not produced at equal time intervals and the regular output of the sync. latch may be preferred to enable the counter read-out and summation to be synchronised with external circuitry.

If the contents of the counter 20 or the registers 37 or 39 are arranged to be transferred to an external circuit e.g. a computer then the control element 29 may be provided with means to inhibit the transfer while any changes of value of the contents are taking place.

The second counter 20 described above provides in a convenient form means for storing the value of the number of oscillator pulses required to produce the current value I' in the accelerometer coil.

FIG. 3 shows an alternative arrangement in which a single counter (the reference counter 15) is used. The parallel binary outputs of the counter are connected to parallel binary inputs of a serial output shift register 46. The line 23 is connected to a trigger input of the register 46 such that a signal on the line 23, caused by breaking of the switch 12, transfers the instantaneous value of the reference count into the register but prevents further transfer. The register is provided with a serial output line along which the stored value is shifted under the control of shift pulses from the control element 29. If the contents of the register are to be fed into a computer (not shown) which computer is arranged to shift the contents of the store at any time, then gating means 47 is provided to prevent such shifting while the stored value is changing. Similar gating means 48' (not shown) may be provided at the output of the summation registers 37 and 39 to prevent their contents from being removed when undergoing change. In the above described embodiments the value of acceleration in any reference time period is available in serial binary form, and the summation process is a serial operation. If required the summation could be done as a parallel operation taking a parallel output from the counter 20 or register 46. In such an arrangement the counter 20 or register 46 could be replaced by a simple buffer store triggered to accept the state of the reference counter 15 by breaking of the switch 12.

In any of the above described arrangements the step height and step frequency are fixed with respect to the oscillator frequency and the resistor network 16 and the number of steps per reference time period is dependent on the interconnection of the gate 17 inputs. The apparatus will operate satisfactorily providing the current I' required to overcome the acceleration force never exceeds I", the maximum current generated. Thus the maximum value to which it is desired to measure acceleration must be known and the value of I" chosen accordingly. The value of I" may be varied by changing the number of counter steps required to open the gate 17. Alternatively the voltage V or the component values in the resistor network may be changed to alter the magnitude of the current steps applied to the accelerometer coil.

The accelerometer may provide simultaneously with, or instead of, the digital output an analogue indication of the acceleration value. The presence of a signal on the line 22, that is, when switch 12 is made, may be used to switch an output voltage of a predetermined magnitude, the output voltage being reduced to zero when the switch is broken. In any one reference time period the fraction of the period that an output voltage is produced is directly proportional to the acceleration value. Thus the average of a voltage level appearing gives an analogue measure of the acceleration.

In the description given above the accelerometer is of the "linear" type in which the value of the current in the accelerometer coil is linearly related to the value of the acceleration force it overcomes. The accelerometer may be of a non-linear type such as that described in British Patent Specification No. 1,259,203, wherein the mass is moved by magnetic attraction requiring a current varying as the square of the displacement in which case the resistor network 16 is scaled to maintain the linear relationship between the number of current steps and the value of the acceleration force.

What we claim is:

1. A force-balance accelerometer comprising an inertial mass arranged to be acted upon and displaced by an acceleration force, an electromagnetic coil responsive to a current flow therein to exert a restoring force on the mass in opposition to the acceleration force, switching means operable to maintain a first state while the acceleration force is greater than the restoring force and operable to maintain a second state while the restoring force is greater than the acceleration force, coil energising means responsive to entry of the switching means to the first state to apply to the coil a reference signal in the form of a current, the magnitude of which varies within a reference time period, and in accordance with a predetermined law, from a datum value to a predetermined reference value, thereafter returning to the datum value, and output means responsive to entry of the switching means to the second state in any reference time period to provide an output signal representative of the magnitude of the reference signal, with respect to the datum value, at which the restoring force equals the acceleration force and indicative of the magnitude of the acceleration force in that reference time period.

2. An accelerometer as claimed in claim 1 in which the coil energising means comprises an oscillator, a counter of oscillations produced, said counter being enabled to count by an external signal derived from said switching means arranged to return automatically to zero after a predetermined number of oscillations have been counted and operable to provide as an output signal the accummulating total count in binary parallel form, a resistor ladder network fed by an external voltage source and connected to the counter output such that as the count increases appropriate resistor values are switched into series with the voltage source and the coil to provide a current increasing from the datum value in a stepwise manner.

3. An accelerometer as claimed in claim 2 in which the coil energising means further comprises synchronisation means comprising a bistable element SET by the entry of the switching means to its first state to provide a counter enabling signal and RESET by return of the counter to zero to remove the signal.

4. An accelerometer as claimed in claim 2 in which the output means comprises a further counter of oscillations produced by the oscillator and responsive to entry of the switching means to its first state to begin counting and responsive to entry of the switching means to its second state to stop counting.

5. An accelerometer as claimed in claim 2 in which the output means comprises a buffer circuit having a parallel binary input, said circuit being responsive to entry of the switching means to the second state to receive the instantaneous parallel binary output of the counter of the coil energising means.

6. An accelerometer as claimed in claim 2 including a control element comprising a generator of shift pulses operable to remove the contents of the output means in response to a trigger signal.

7. An accelerometer as claimed in claim 6 in which the trigger signal is produced in response to the counter of the coil energising means returning to zero.

8. An accelerometer as claimed in claim 6 in which the trigger signal is produced is responsive to the switching means entering the second state.

9. An accelerometer as claimed in claim 1 in which there is also provided summation means operable to summate a plurality of accelerometer output signals over a plurality of reference time periods to provide a second output signal.

10. An accelerometer as claimed in claim 9 in which the summation means comprises a serial input/output shift register and an addition element operable to add the contents of the accelerometer output means and the shift register in each reference time period and to return the contents to the shift register, the contents of the shift register comprising the said second output signal.

11. An accelerometer as claimed in claim 9 in which there is provided further summation means operable to summate the second output signal over a plurality of reference time periods to provide a third output signal indicative of the distance travelled by the accelerometer.

12. An accelerometer as claimed in claim 1 including gating means operable to inhibit the removal of output signals while those signals are changing in value.

* * * * *